March 3, 1964     J. L. ECHENIQUE ETAL     3,123,164
ELECTRONIC-MEASURING AND RECORDING SYSTEM
Filed May 24, 1960     10 Sheets-Sheet 1

INVENTORS
Jesus Lasa Echenique
Hubert Voegeli

BY *Strauch, Nolan & Neale*

ATTORNEYS

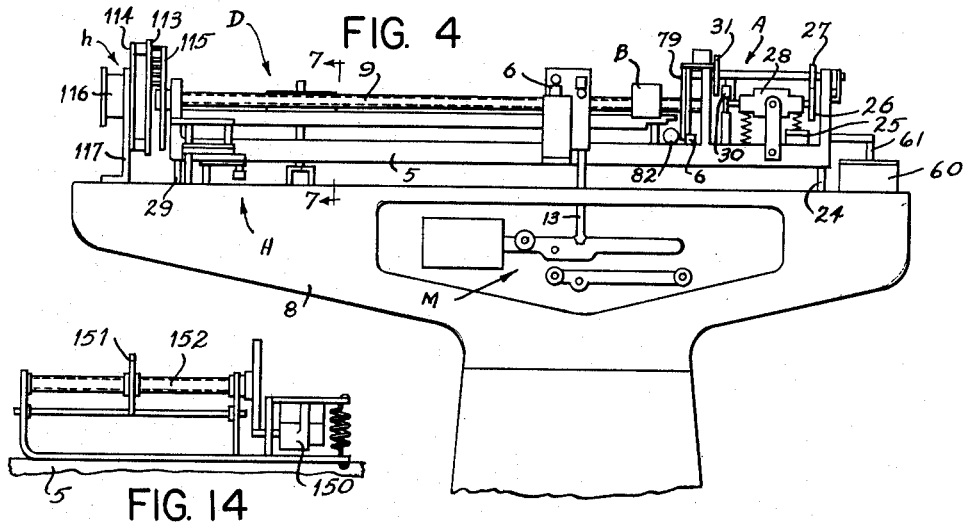
FIG. 4
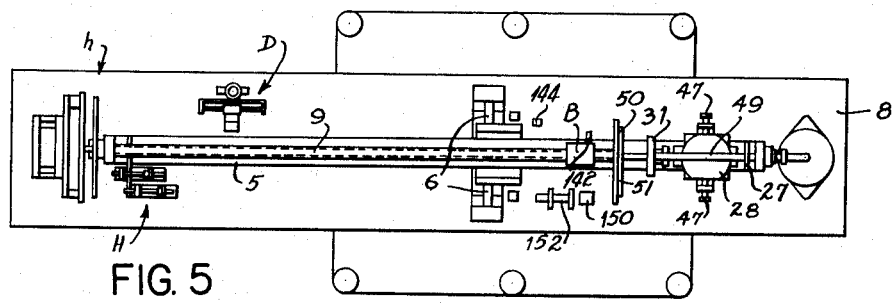
FIG. 14
FIG. 5
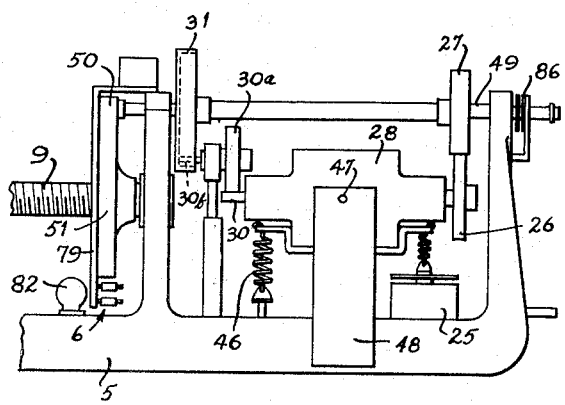
FIG. 6
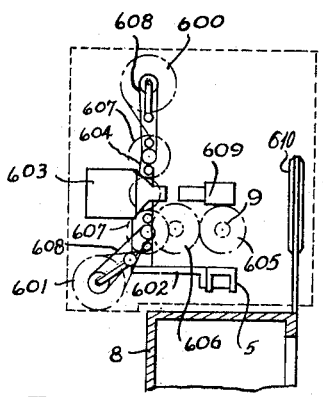
FIG. 21
INVENTORS
Jesus Lasa Echenique
Hubert Voegeli
BY Strauch, Nolan & Neale
ATTORNEYS

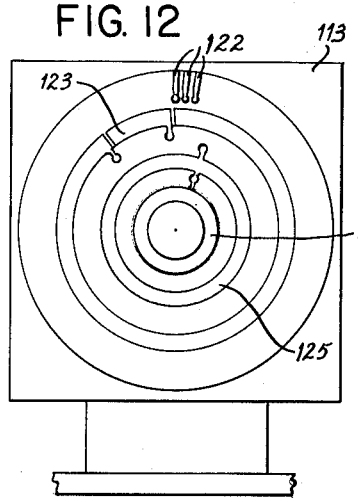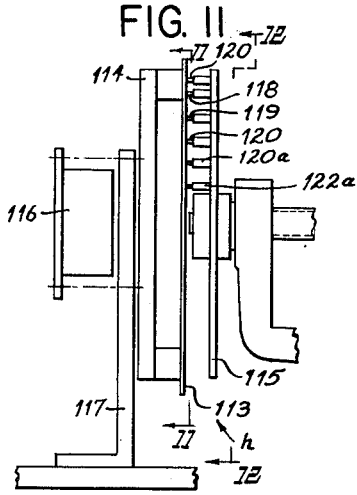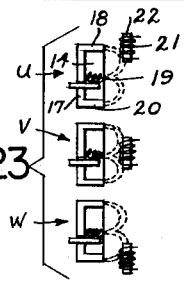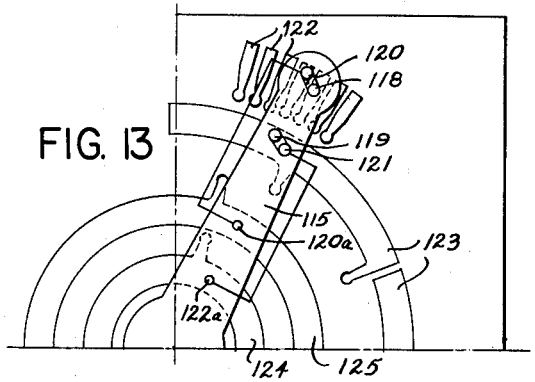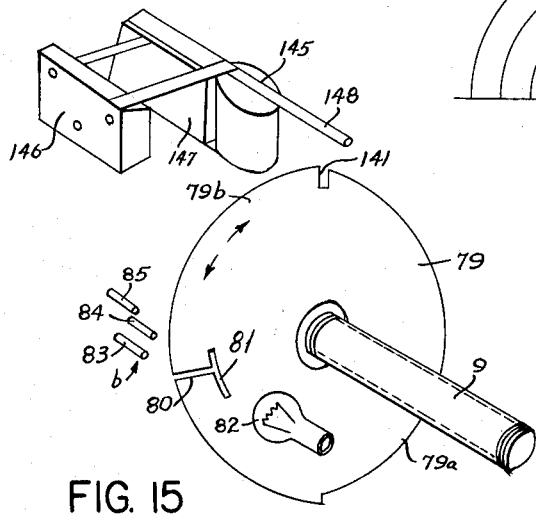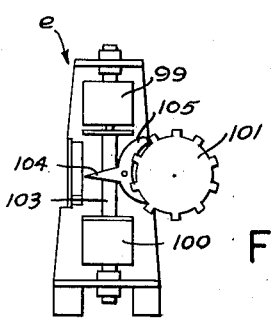

March 3, 1964   J. L. ECHENIQUE ETAL   3,123,164
ELECTRONIC-MEASURING AND RECORDING SYSTEM
Filed May 24, 1960   10 Sheets-Sheet 4
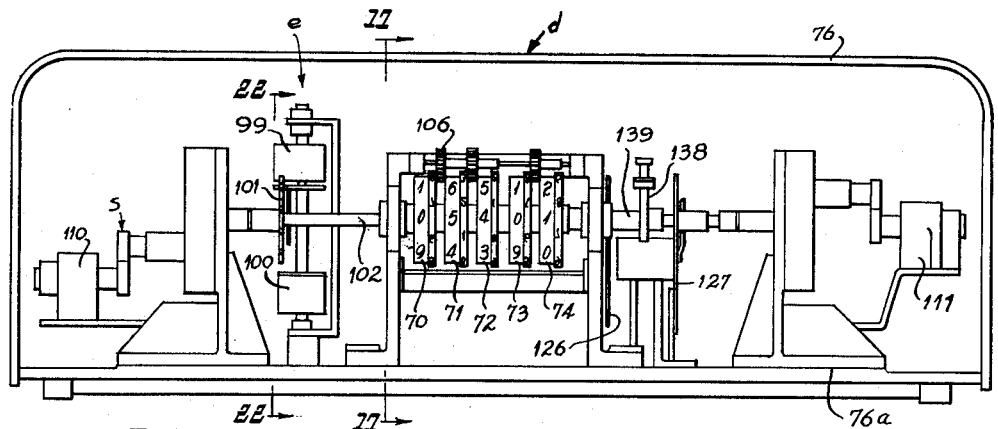
FIG. 16
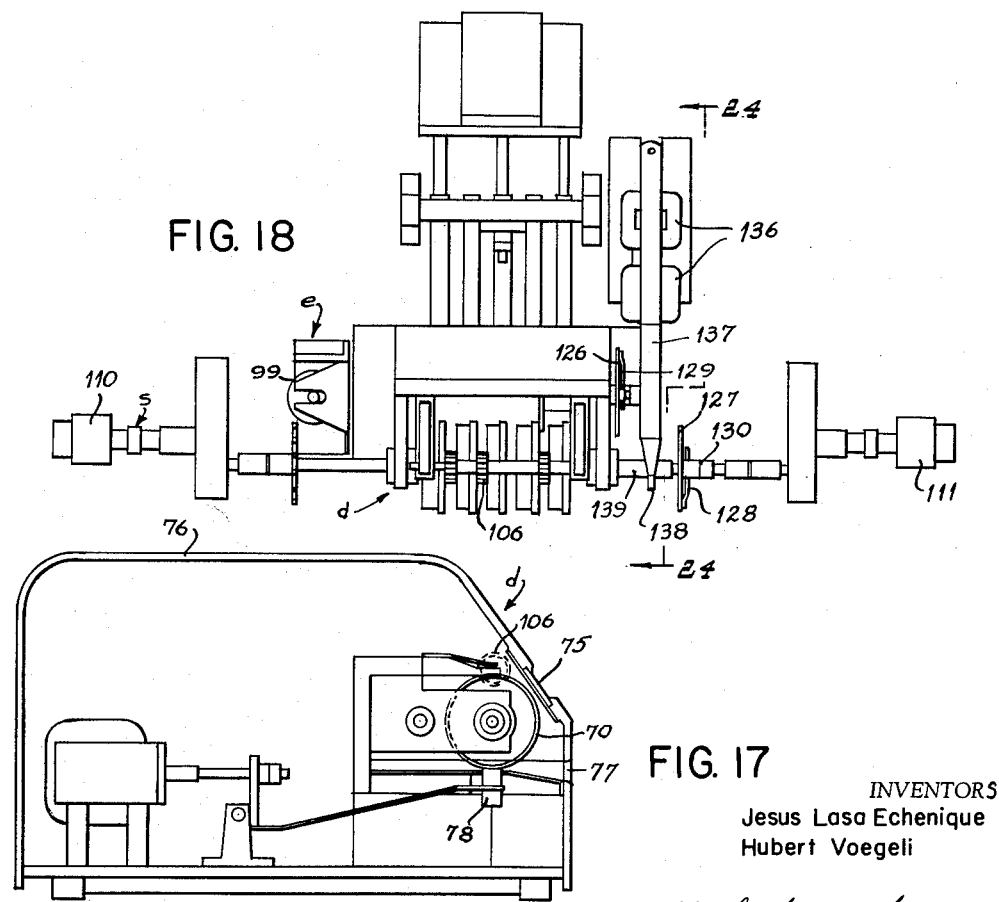
FIG. 18
FIG. 17
INVENTORS
Jesus Lasa Echenique
Hubert Voegeli
BY  *Strauch, Nolan & Neale*
ATTORNEYS

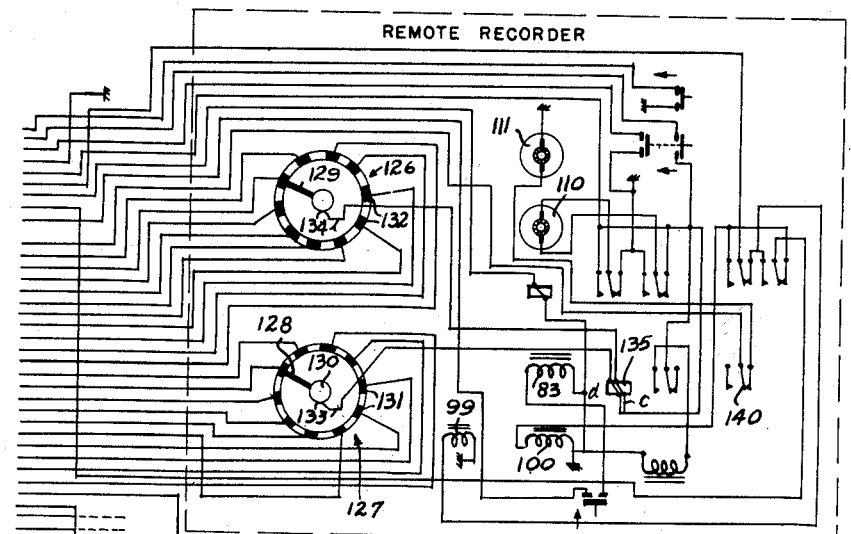
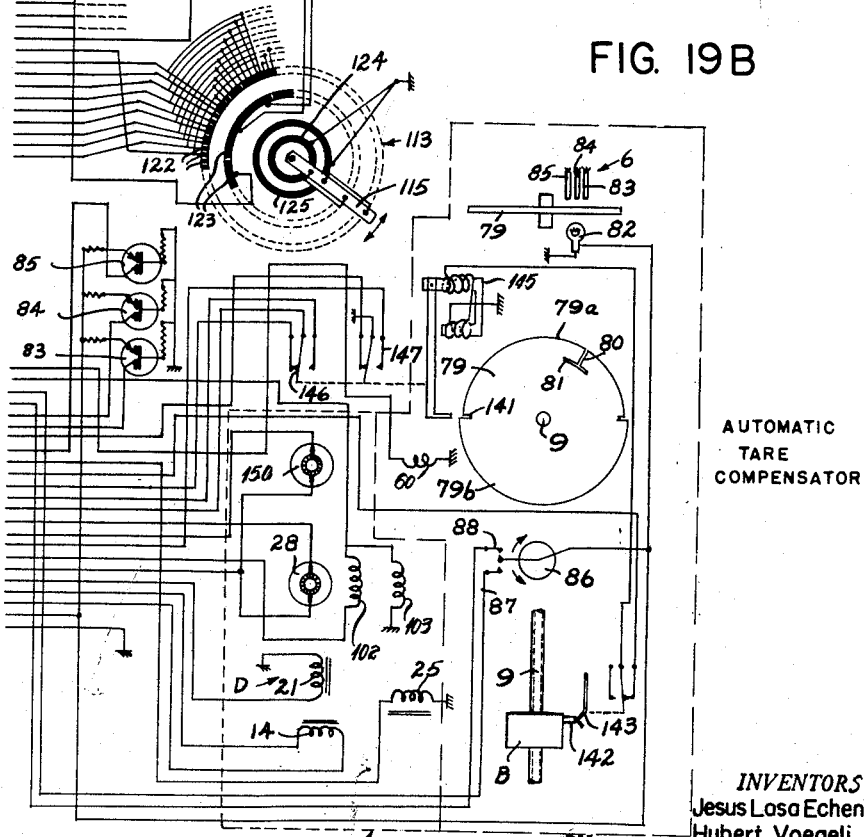
FIG. 19B
AUTOMATIC TARE COMPENSATOR
Beam Driven Motor and Direction Sensor
INVENTORS
Jesus Losa Echenique
Hubert Voegeli
BY
ATTORNEYS March 3, 1964 J. L. ECHENIQUE ETAL 3,123,164
ELECTRONIC-MEASURING AND RECORDING SYSTEM
Filed May 24, 1960 10 Sheets-Sheet 9

JESUS LASA EICHENIQUE
HUBERT Voegeli
INVENTORS

BY
ATTORNEYS

March 3, 1964   J. L. ECHENIQUE ETAL   3,123,164
ELECTRONIC-MEASURING AND RECORDING SYSTEM
Filed May 24, 1960   10 Sheets-Sheet 10

INVENTORS
Jesus Lasa Echenique
Hubert Voegeli
BY Jacobi & Davidson

United States Patent Office 3,123,164
Patented Mar. 3, 1964

3,123,164
ELECTRONIC-MEASURING AND RECORDING SYSTEM
Jesus Lasa Echenique, Villafranca-de-Oria, Spain, and Hubert Voegeli, Fargues-Saint-Hilaire, France, assignors, by mesne assignments, to Inventions Finance Corporation, a corporation of Delaware
Filed May 24, 1960, Ser. No. 31,465
32 Claims. (Cl. 177—1)

This invention pertains to improved means for automatically conducting measurements of forces and weights. More specifically, the invention relates to an electronic and electro-mechanical system capable of automatically measuring with high precision, the weights of objects and recording such measurements on transient visual display devices and printed records.

The need for remotely operated, heavy load capacity precision scales or force measuring apparatus has been established in numerous industries where automatic processing of materials must be conducted remotely either for safety purposes or for the convenience and efficiency of high speed automated production. The inherent accuracy obtainable from balance-beam platform type scales has long been recognized; however, the efficiency of such scales when used in an automated process involving variable weights or forces, is dependent to a great extent, upon the rapidity and accuracy with which the counterweight on the balance beam can be moved to and fro to rebalance the scales for each successive weighing. The efficiency of such scales when used in an automated process is further dependent upon the accuracy and rapidity of the displaying and recording of the measured values of the weights or forces. The accuracy of conventional industrial beam scales, with dial indicators, is usually limited to approximately one one-thousandth of the total scale range. The present invention provides means for measuring with accuracy to one hundred-thousandth of the scale range, or better.

For many decades, numerous attempts have been made to provide automatic scales capable of rapidly rebalancing the counterweight movement; many of these have relied upon strictly electrical control systems, while others have relied upon mechanical or electro-mechanical systems for speed control and anti-hunting control of the counterweight moving and stopping element.

In the electrical forms of such systems, various means involving photocells, inductances, resistances, potentiometers, relay switches and electromagnetic elements were used with correlated control systems of the servo response type for detecting deflection from the zero or null position of the balance beam, together with damping devices designed to eliminate the excessive amplitude deflections of the balance beam when the load is placed on the load platform, these devices including electromagnetic load balances, countersprings, hydraulic dash pots, etc., Patents 2,602,660, 2,914,310, and others). These devices may work satisfactorily in theory, but their cost prohibits them from being of real value to common consumers.

The mechanical or electro-mechanical attempts (Patents 690,855, 1,952,171, 2,040,071, 2,068,555 and others), failed to accomplish a rapid movement of the counterweight element thus rendered the scales inaccurate in the fine measurements, despite their delicate and complex parts which required constant adjustment and maintenance.

In addition said electro-mechanical devices did not provide zero adjustment, damping, or automatic adjustable compensator-rebalancing systems, automatic printing and read out indices to justify changes from what exist in the present market.

In our present invention, we have utilized a combination of electrical and mechanical means and have incorporated them with an improved phase—opposed inductance sensing element and a fully automatic electronic response system containing an improving interrupter and memory circuits to assure extreme accuracy in adjustment of the counterweight for rebalancing the beam without overshooting the rebalance position for each weighing operation, and without necessity of returning to zero after removal of each successive weight-load. By doing so, we have accomplished in a most efficient manner and with a simple mechanical compensating device, the variable speed control of the counterweight without dependence on the oscillation of the balance beam beyond the zero point for controlling the final fine adjustment. Said compensating device acting out of phase with the deflection of the balance beams in a direct manner such as to effectively damp out the extreme deflections of the beam. By doing so, we believe we have accomplished in a most economical way our purpose by eliminating the inaccuracies in the prior art arrangements.

Main Objects of the Invention

The primary object of our invention is to provide an improved automatic weighing and force measuring apparatus composed of new and improved electrical and mechanical means which eliminate the objectionable attributes inherent in the means provided in the prior art, and which is of superior accuracy and efficiency in measuring weights or forces ranging from very small values to very large values.

To provide an automatic weighing system wherein there is an improved means for rapidly and automatically moving and stopping the counterweight on the balance beam, to accurately rebalance the scales commensurate with the load on the apparatus for each successive weighing operation.

To provide an automatic weighing system in which there is incorporated an automatic electronic sensing device comprising a novel arrangement of conventional electrical elements for sensing at any instant the direction and amount of unbalance of the balance beam, with digital precision and accuracy.

To provide an automatic weighing apparatus wherein there are incorporated electro-mechanical means for automatically integrating and visually displaying and recording, either in locations close to the weighing head or remote therefrom, the precisely measured values of weights or forces applied to the apparatus load platform.

To provide an automatic weighing apparatus wherein there is incorporated an improved electrical control means whereby the operation of the apparatus can be controlled by an operator located at a station remote from the weighing apparatus.

To provide a system in which an improved electrical detecting and transmitting means for detecting the weight measure of the load on the scale with greatly improved accuracy, and transmitting electrical signals representative of such measure to a remote recorder.

To provide an automatic weighing and force measuring apparatus wherein there is incorporated an automatic electro-mechanical means for compensating for any accidental, undesired, off-zero setting of the apparatus when under no load, or tare load condition; such accidental off-zero setting possibly resulting from wearing of the working parts of the apparatus or from accidental tare loads, such as snow, rain or other environmental residue being applied to the load sensing means of the apparatus.

To provide a system in which improved means capable of automatically and mechanically compensating the excessive random deflections imposed on the scale balance beam when the weight load is first applied, or when it shifts on the platform.

Another object is to provide arrangements by which electrical impulses generated in accordance with the movement of the counterpoise are counted, upwards or downwards in accordance with the sense of the movement, to produce a final count precisely indicating the ultimate position and hence the exact weight or force. The final count so obtained is registered, indicated and/or printed locally or at one or more remote stations, which may also automatically print the date, order number, or similar information for inventory, audit and like control and supervisory functions.

A further object is to provide a system in which the same data can register in printed form by a set of type wheels connected directly to the register wheels. These printing operations may be performed automatically or periodically as desired. Duplicate registrations are readily provided, either by duplicate printing or by a separate printing operation at a second remote or supervisory location. The use of electrical pulses for conveying the basic information, i.e., the weight in terms of the sense or direction of counterpoise motion along with its numerical value, permits the greatest flexibility in the data output facilities.

To provide a more complete disclosure of the subject invention, the following description is presented in conjunction with the accompanying drawings:

FIGURE 4 is a front-side view of the balance beam and its supporting structure and associated devices constituting the primary mechanical assembly of the weighing apparatus in its preferred form.

FIGURE 5 is a top plan view of the balance beam assembly shown in FIGURE 4.

FIGURE 6 is a detailed view of the motor and dual-speed drive for the counterweight moving device on the balance beam of the weighing apparatus.

FIGURE 11 is a detailed enlarged view of the load measure transmitting unit.

FIGURE 12 is a view taken on line 11—11 of FIGURE 10 showing further details of the load measure transmitting unit.

FIGURE 13 is an enlarged view taken on the line 12—12 of FIGURE 10 showing details of the wiper arm and brushes of the load measure transmitting unit.

FIGURE 14 is an enlarged detailed view of the automatic off-zero compensating device.

FIGURE 15 is an isometric diagrammatic view showing the zero latching disk of the automatic, off-zero compensating device.

FIGURE 16 is a longitudinal section view of the load measure remote read-out and printing device.

FIGURE 17 is a section taken on line 17—17 of FIGURE 16.

FIGURE 18 is a top plan view of the load measure remote read-out and printing device shown in FIGURE 16, except with cover removed.

Figure 19A:
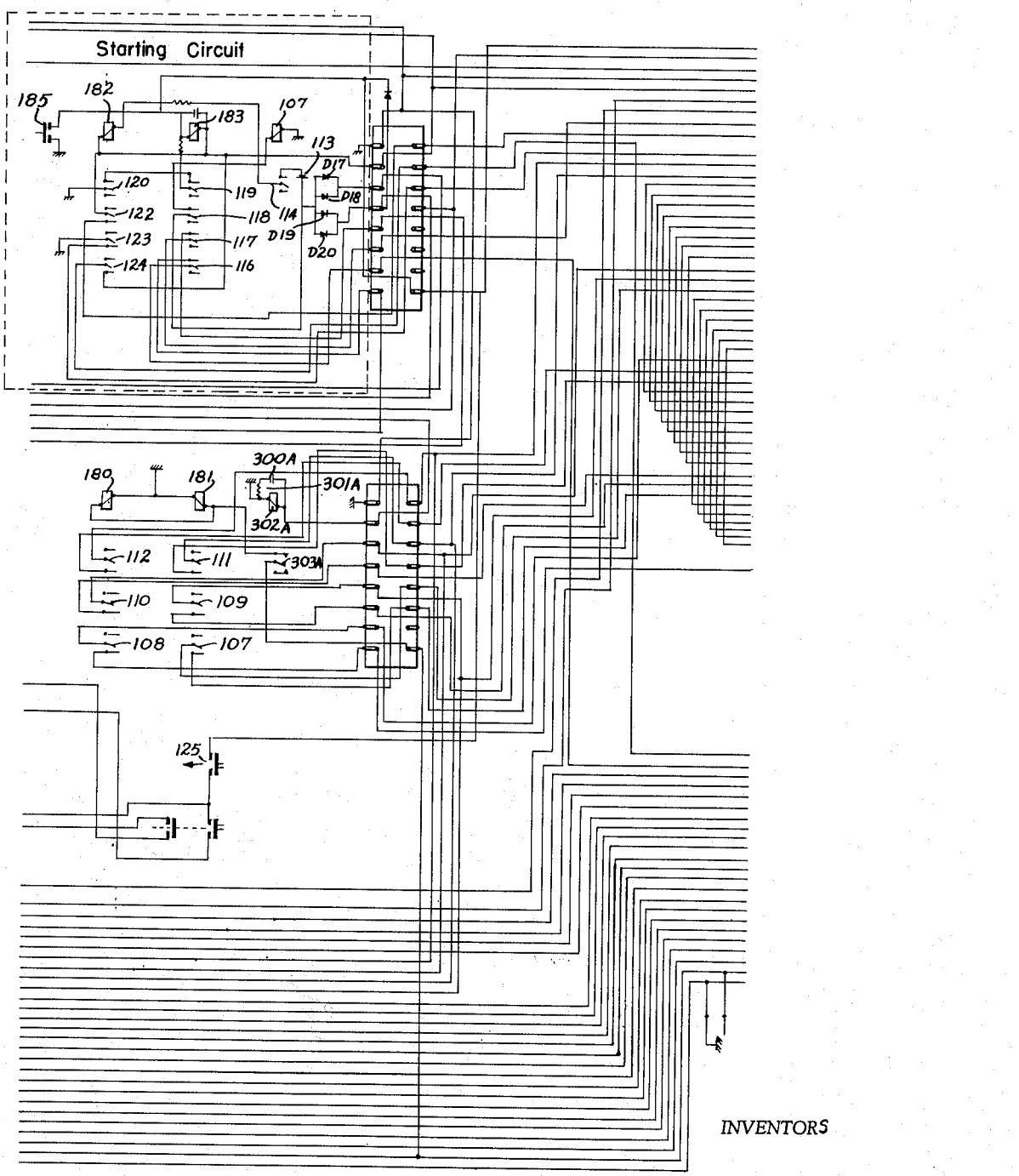
Figure 20A:
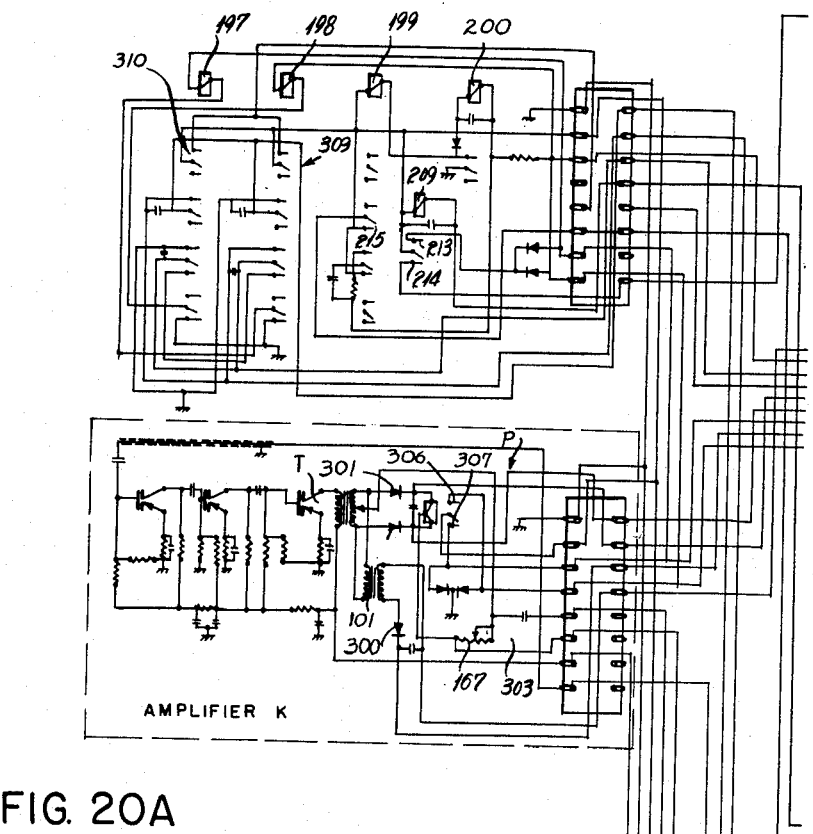
Figure 20B:
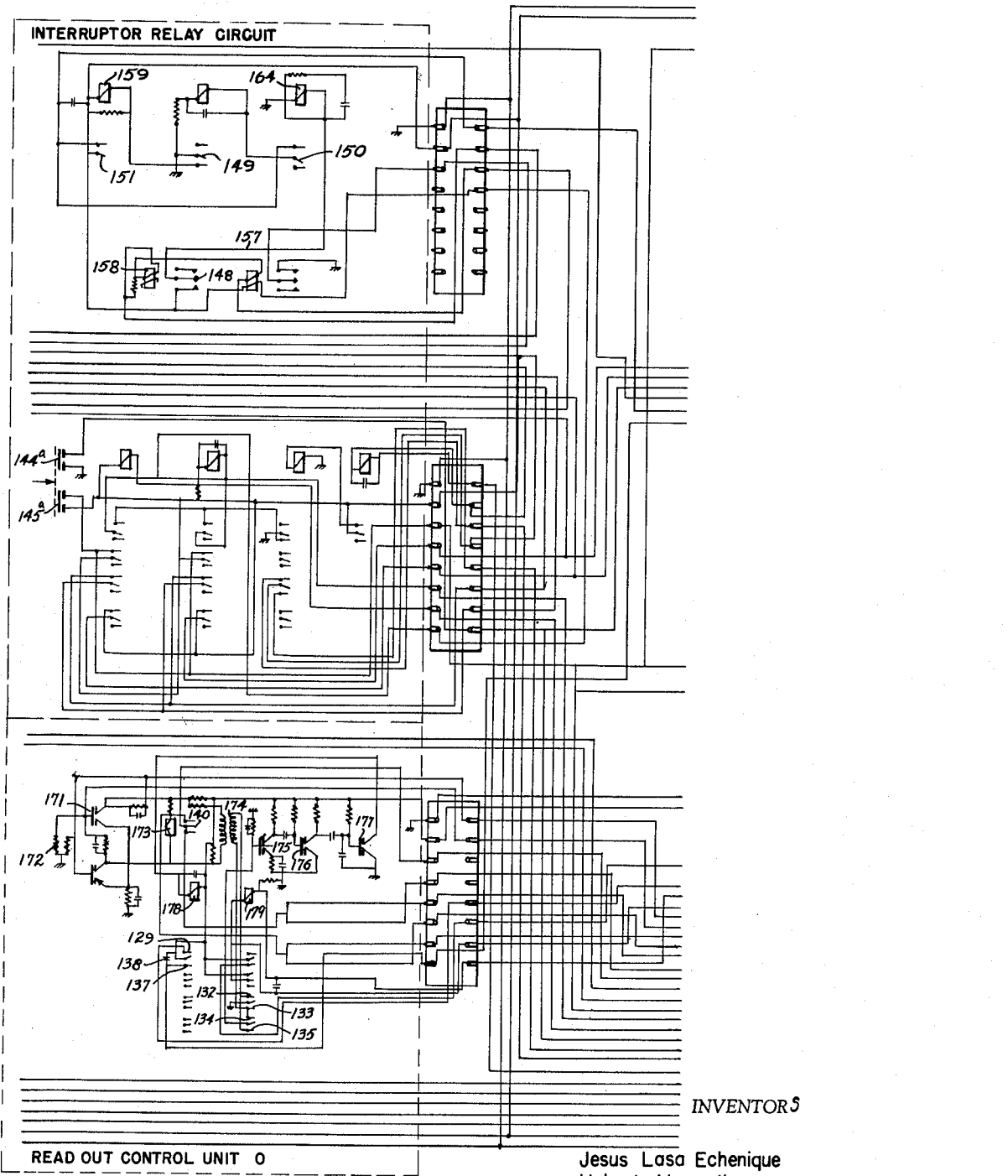

FIGURES 19 and 20 together comprise the detailed circuit diagram of the complete electronic and electro-mechanical control system for the weighing apparatus of the subject invention, including all automatic sensing, transmitting and control elements of the apparatus.

FIGURE 21 is a partial sectional view showing the arrangement of the transient visual display read-out device which provides an alternative or supplemental load measure read-out method when the remote read-out device is not desired.

FIGURE 22 is a fragmentary end elevational view of the drum actuating mechanism of the counter taken on line 22—22 of FIGURE 16 and looking in the direction of the arrows.

FIGURE 23 is a diagrammatic sketch showing the magnetic flux paths for three different positions of the coils of the unbalance sensing device of FIGURE 4.

Figure 24:
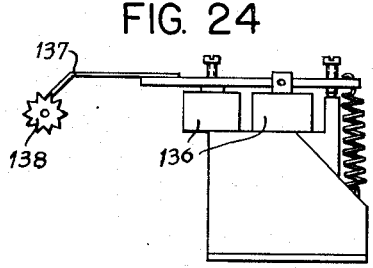

FIGURE 24 is a fragmentary end elevational view of a portion of the counter operating means taken on line 24—24 of FIGURE 18 and looking in the direction of the arrows.

Figure 25:
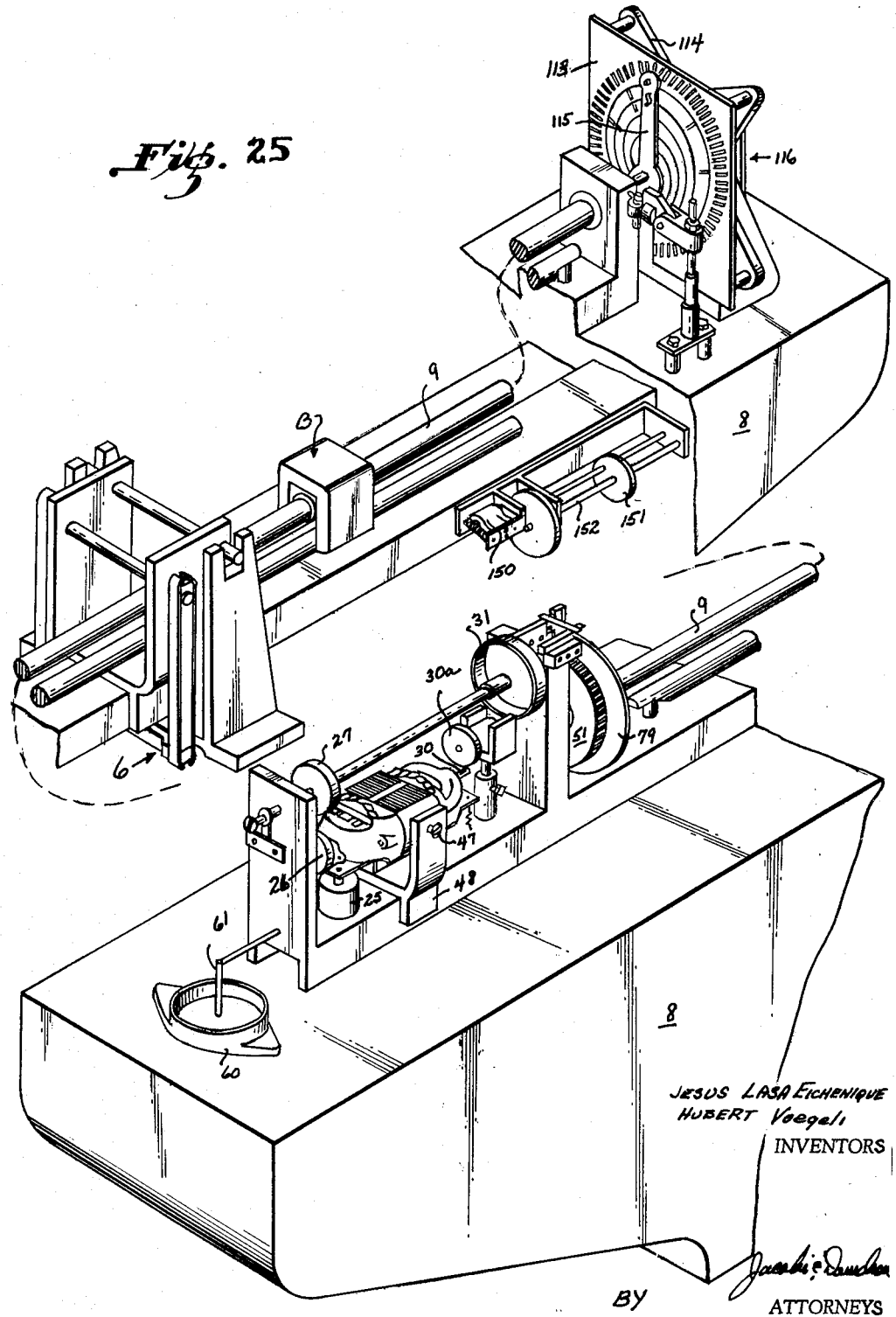
Figure 26:
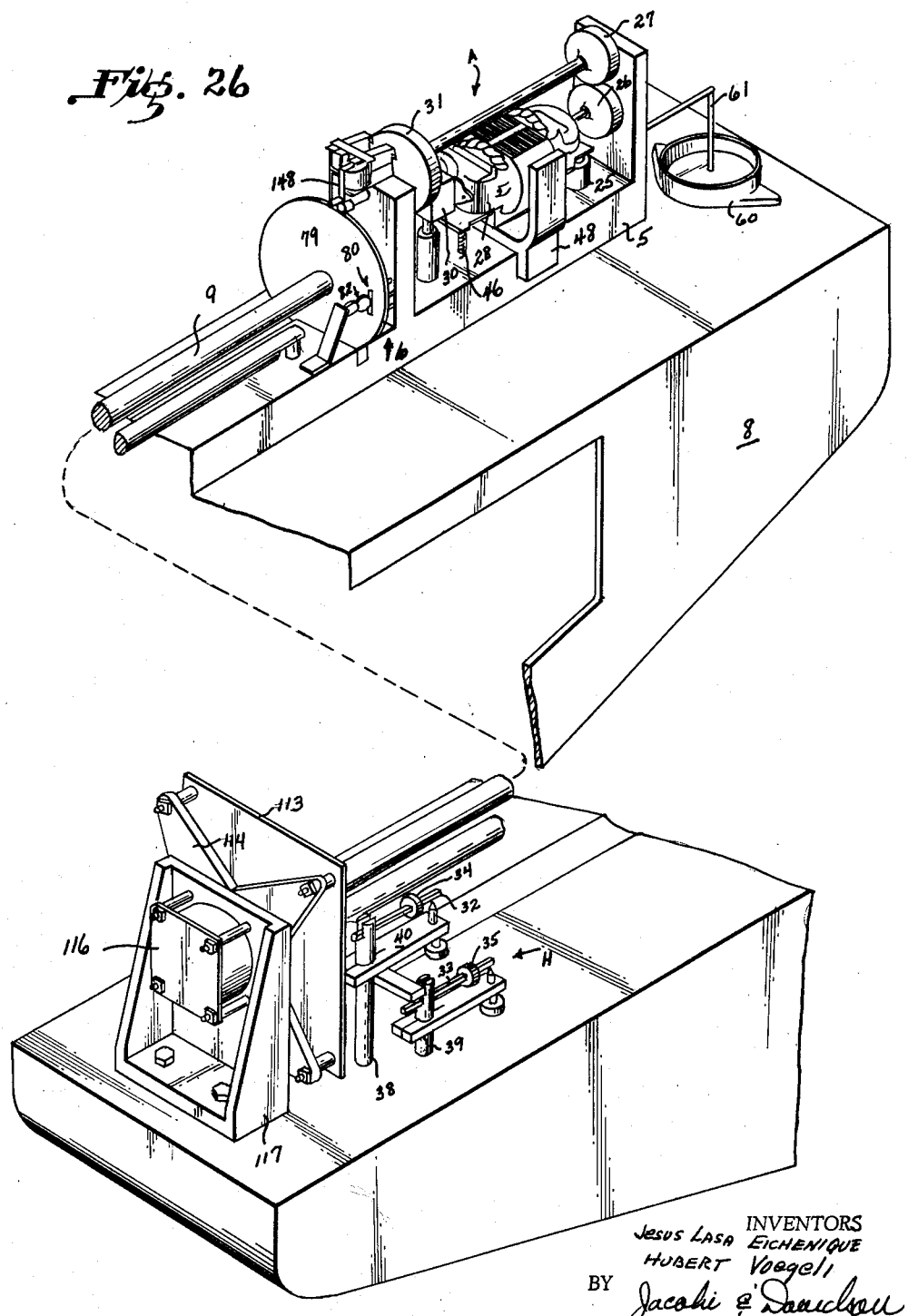

FIGURES 25 and 26 are broken elevational views of the control portion of an apparatus constructed in accordance herewith.

*General Description of the Invention*

Figure 1:
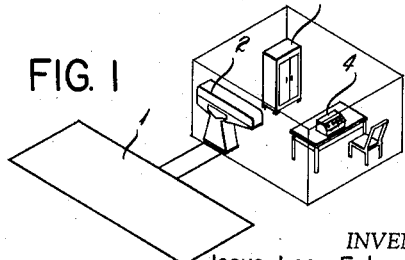
FIGURE 1 is a diagrammatic view of the four principal parts of the weighing apparatus of this invention shown as they may be arranged for remote control and read-out operation.

As shown digrammatically in FIGURE 1, a preferred form of this invention consists of four principal units; namely, the load platform 1; the counter-weight balance beam and load-sensing and measure transmitting unit 2; the control panel and computing unit 3; and the remote load measure readout and printing unit 4.

Figure 2:
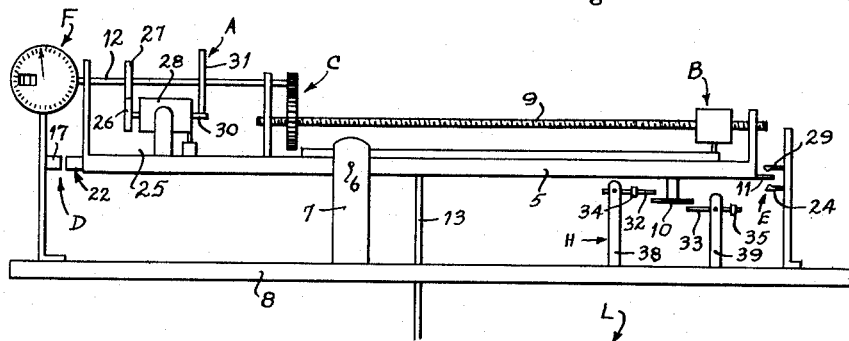
FIGURE 2 is a schematic diagram of the arrangement of the principal mechanical parts of the weighing apparatus. This view is intended to illustrate the principles of the automatic beam-balancing device; it does not show a true physical embodiment of the invention.

Referring to FIGURE 2 which illustrates the basic mechanical elements of the counterweight balance beam and load sensing and measure transmitting unit, the balance beam 5 is supported on knife edge or frictionless bearing fulcrum 6 secured on bracket 7 which is fixed to the stationary stand frame 8. Mounted on the balance beam 5 are the counterweight servo motor and dual speed friction drive assembly A; the counterweight B; the counterweight drive screw 9; the counterweight drive gear train C; the unbalance sensing device D; the mechanical phase compensating actuator 10; the actuator 11 for the counterweight servo-motor-speed selector switch E; and the drive shaft 12 for the load measure integrating and indicating device F. Also attached to the balance beam 5 by means of a frictionless bearing, is the load transfer link 13 from the linkage system connecting to the load platform 1.

*General Description of the Operation*

A general description (see FIGURES 1, 2 and 3) of the operation of the apparatus of this invention is as follows:

A load or force applied to the platform 1 causes a proportional force to be applied through a linkage system to the balance beam 5 where the direction and measure of the unbalancing force is sensed by an inductive, electrical sensing device D and by means of an automatic, electronic computing and feed-back circuit L associated with the said sensing device, the servo motor 28 drives the screw rod 9 at automatically regulated speeds and in alternating directions to move the counterweight B to or fro until it has reached the position required to rebalance the beam 5. Associated with the servo motor is an automatic, integrating and indicating device F which displays and records the measure of weight or force applied to the platform 1; such measure being proportional to the net quantity of revolutions generated by the screw rod 9 in displacing the counter-weight B from the no-load balanced position to the load balanced position. The indication and recording device F may be located either remotely from the balance as shown by 4 in FIG- URE 1, or an alternative indicating device may be attached to the balance frame 8 as shown in FIGURE 21.

Detailed Description of the Operation

The detailed description of the operation of the apparatus of this invention is as follows:

Referring to FIGURES 1, 2, 3 and 4, when a load or force is applied to the platform 1, a force proportionate to the load on the platform is transmitted through an appropriate mechanical linkage system M to the link rod 13 which bears on the balance beam 5 of the load sensing and measure transmitting unit 2.

Starting Circuit

To start the weighing or force measuring operation, the starting switch 185 (FIGURE 19) must be closed momentarily.

Relay 183 operates, contact 118 closes and relay 107 also operates through diodes D17 and D18 or D19 and D20, and contact 15a or contact 15b of relay P, FIGURE 20. Thus the scales can be started only when the plate is loaded or when it is necessary to make a zero setting.

Contact 114 closes and relay 182 receives power from the positive supply terminal to thereby become energized. Contacts 119 and 120 close and relay 183 remains operated when the push button 185 action is released. Contact 117 closes and enables impulses counting the hundreds to reach electromagnet 100 or electromagnet 99.

Contact 116 closes and enables motor 28 to receive power from negative terminal through the series compensating coil 102 forming part of the same motor, and through contact 151 of relay 159. Stator coil 103 of motor C is also energized.

When the weighing operation ends, contacts 306 and 307 of relay P open simultaneously and relay 107 opens after a delay, owing to the presence of condenser 113 of high value parallel-connected with its coil through contact 118.

Relays 107 and 182 release. Contact 120 opens and releases relay 183. Thus, contacts 116, 117 and 118 open. Motor 28 is no longer energized, and the impulses to the reading and printing system stop.

Contact 122 closes and electromagnet 83 controlling the printing can receive negative polarity.

Contact 123 closes and motor 110, which drives the reading and printing of the units and tens drums can run on.

Contact 124 closes and electromagnet 60 operates, which causes printing of these figures.

After each weighing operation it is necessary to press again on push button 185 for restarting the scales.

The scales can be also started from push buttons 125 and 92.

Figure 8:
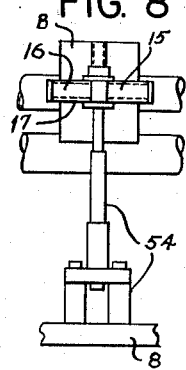
FIGURE 8 is a right side view of FIGURE 7.
Figure 7:
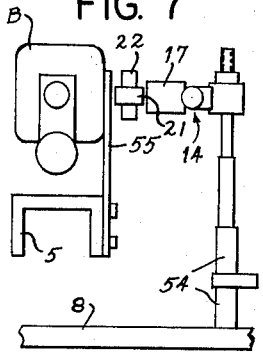
FIGURE 7 is a view taken on line 7—7 of FIGURE 4 showing the arrangement of the parts of the unbalance sensing device and the relative position of the counter weight with its moving device.

When the proportional load is applied by link rod 13 to the balance beam 5, the beam is unbalanced and caused to rotate on fulcrum 6 for a limited angular distance. When the beam 5 has rotated to its limit in a clockwise direction (FIGURE 2) the actuator 11 contacts pole 24 of the servo motor high speed selector switch E and opens the electrical circuit to the electromagnet 25 which, (in a manner to be described hereinafter) shifts the friction drive train A into high speed in which condition the drive train wheel members 26 and 27 are held in engagement by spring 46, (FIGURE 6), and through gear train C, the screw rod 9 is rotated to move the counterweight B to the rebalance position. Also, when the balance beam 5 has rotated out of balance to any extent or direction, due to the applied load, the poles or core 22 of coil 21 of the unbalance sensing device D (see FIGURES 7, 8 and 23) are moved upward or downward to a position out of center with respect to the poles of core 17 of coil 14. Any out of center position of the poles 22 closes the electrical circuit to start the direct current servo motor 28 which drives the screw rod 9 to move the counterweight B in the proper direction required to rebalance the beam 5.

Throughout the weighing operation the speed and direction of the motor 28 are automatically controlled by the electronic control circuits shown in FIGURES 19 and 20. (A more detailed description of the unbalance sensing device D and the associated control circuit for the servo motor 28 will appear later in the following description.) When the balance beam 5 rotates to its limit in a counterclockwise direction, the actuator 11 contacts pole 29 of the servo-motor-high speed selector switch E and again causes the friction drive train A to shift into high speed. A double action oil dashpot 60 is provided on the frame 8 at one end of the balance beam 5. Through linkage 61, FIGURE 4, this dashpot attenuates the rapid, large amplitude oscillations of the balance beam 5. When the oscillations of the balance beam 5 have become small enough, as when the counterweight B has closely approached the balance point, the actuator 11 does not contact either of the poles 24 or 29 of the servo-motor-high speed selector switch E and the friction drive train A operates at slow speed through engagement of drive-train wheel members 30, 30a and 31, (FIGURE 6).

Mechanical Phase Compensator

Figure 10:
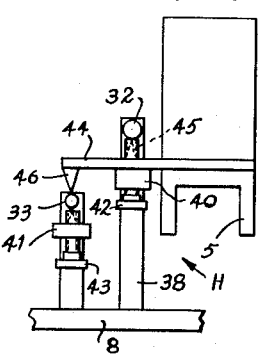
FIGURE 10 is a right side view of the details shown in FIGURE 8.
Figure 9:
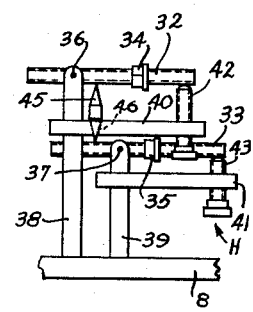
FIGURE 9 is an enlarged detailed front view of the mechanical compensating system with auxiliary levers.

To assist the damping out of the oscillations of the balance beam 5, a mechanical phase compensator H is provided (see FIGURES 1, 9 and 10). The phase compensator H comprises two auxiliary balance levers 32 and 33, with adjustable counterweights 34 and 35, pivoted on frictionless bearings 36 and 37 mounted on posts 38 and 39 on frame 8. Support bars 40 and 41 which are fixedly fastened to posts 38 and 39 respectively, support the adjustable screws 42 and 43 which function as limit stops for the two auxiliary balance levers 32 and 33. Bar 44 is fixedly attached to balance beam 5 and supports bearing point 45 and 46 which bear upon the auxiliary balance levers 32 and 33 respectively whenever the balance beam 5 is out of balance; point 45 being in contact with lever 32 when beam 5 is out of balance in a counterclockwise direction and point 46 being in contact with lever 33 when beam 5 is out of balance in a clockwise direction. The counterweights 34 and 35 on auxiliary levers 32 and 33 are positioned to tend to oppose the rotation of balance beam 5 when it is out of balance and thus by restricting the larger amplitude oscillations of the balance beam 5, the phase compensator levers 32 and 33 tend to reduce the time required for rebalancing the beam 5 for each weighing. The adjustable screws 42 and 43 are set to stop the clockwise rotation (on FIGURE 9) of auxiliary levers 32 and 33 respectively in positions such that points 45 and 46 will disengage levers 32 and 33 during the final, few smaller amplitude oscillations of the balance beam 5 to freely come to rest in the balanced position.

Movement of the Counterweight

The movement of the counterweight B is accomplished by revolving of screw rod 9. As heretofore mentioned, the speed and direction of rotation of the screw rod 9 is automatically controlled by the electronic control circuit L. To obtain rapid rebalancing of the beam 5 for each weighing operation, means are provided for revolving the screw rod 9 at a faster rate when the counterweight B is a greater distance from the rebalance postion. To obtain accurate stopping of the screw rod 9, to prevent overshooting of the counterweight when it has reached the exact position of the rebalance commensurate with the load on the platform, a combination of mechanical and electronic means are provided to slow down the screw rod 9 as the counterweight B approaches the rebalance position and stops it at the precise moment. The mechanical means is incorporated in the phase compensator device H in combination with the friction drive train A and servo motor 28 as shown in FIGURE 6 and as both previously described.

Electro-Mechanical Speed Changer

The servo motor 28 (see FIGURE 6) is pivoted on bearings 47 supported by brackets 48 fastened to the balance beam 5. When the electromagnet 25 is deenergized, the tension spring 46 holds the motor in position to engage the high speed friction drive wheels 26 and 27 and to disengage the low speed drive wheels 30 and 30a. Drive wheel 27 is keyed to shaft 49. Pinion drive gear 50 is also keyed to shaft 49 and drives spur gear 51 which is keyed to the screw rod 9. When the electromagnet 25 is energized the slow speed drive wheel 30 engages the intermediate friction drive wheel 30a on shaft 30b. Shaft 30b engages friction wheel 31 which is keyed to shaft 49.

The electromagnet 25 (FIGURE 9) is energized when relay switch 215 of control unit R, FIGURE 20, is closed. The relay switch 215 is closed through action of the relays 157, 158 and 200, the diode 300 and condenser 167 when the output current of the secondary coil 53 of transformer T is of a relative high value. The value of the current in coil 53 is proportionate to the induced current in coil 21 of the unbalance sensing device D. The induced current in the coil 21 of the unbalance sensing device D is proportionate to the extent of off center displacement between the fixed coil 14 and the movable coil 21 of the sensing device D.

Automatic Control

Figure 3:
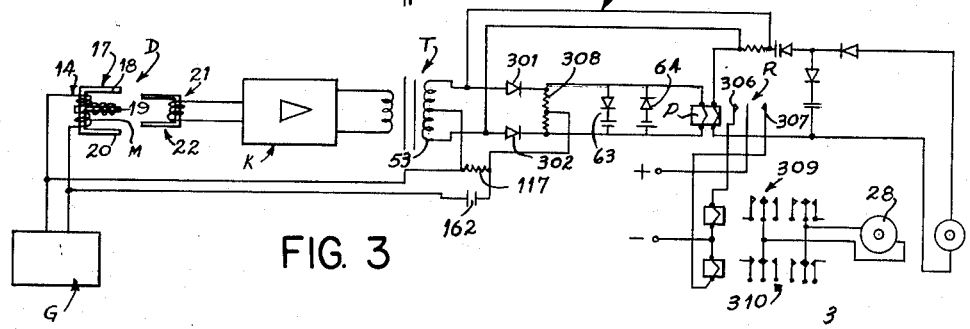
FIGURE 3 is a simplified schematic diagram of the automatic electrical control system for the weighing apparatus.

As shown in the simplified, schematic diagram of the electronic automatic control system illustrated in FIGURE 3, the electrical power supply oscillator G located in the remote control panel 3, supplies an alternating current to coil 14 of the sensing device D. The unbalance sensing device D (see FIGURES 3, 7, 8, and 23) consists of two inductance coils 14 and 21 wound on cores 17 and 22 respectively. Coil 14 on three pole core 17 is mounted in a fixed position by bracket and post 54 on the stand frame 8 and does not move with the balance beam 5. Coil 21 on a two pole inductive core 22 is mounted on the balance beam 5 by bracket 55 at a distance from the fulcrum 6 near one end of the beam. The positions of the two coils 14 and 21 are in close proximity, such that the poles of core 22 are within the induced magnetic field of the poles of core 17. The coil 14 is on the central pole 19 of core 17 (see FIGURE 23) such that the two outer poles 18 and 20 are always of opposite polarity with respect to the central pole 19. The coil 21 is connected electrically to the electronic amplifier K in the remote control unit 3. The voltage signal from coil 21 is zero when the relative positions of coil 21 and coil 14 are centered as shown in V of FIGURE 23. The two coils are in the nulled or zero output position when the balance beam 5 is precisely balanced commensurate with the load on the platform. As the balance beam 5 oscillates on fulcrum 6, the coil 21 moves upward or downward as shown in U and W of FIGURE 23, and with any movement of coil 21 an alternate current is induced in coil 21, which is either plus or minus 90° out of phase with the input current according to the direction of the unbalance of beam 5. (See also FIGURE 19.)

The alternating current induced in coil 21 of the sensing device D is amplified by the amplifier K and flows into the secondary coil of transformer T, FIGURE 20, where it is divided and then each part rectified by diodes 301 and 302 connected to the coil of relay P through resistance 308. The voltage on the coil of relay P is limited by the opposing, polarized rectifiers 63 and 64. The current from K is thus phased through phase comparator circuit L, and resistor condenser circuit 162 and 167, so as to be 90° out of phase with the current in coil 14 of the sensing device D and then returned to the secondary coil in the power supply oscillator G, thus producing a direct current through relay P corresponding to the transient phase relationship between the currents in coil 14 and coil 21 of the unbalance sensing device D. This latter phase relationship will correspond to the direction of displacement of coil 21 with respect to coil 14 (see FIGURE 23) which also corresponds to the direction of unbalance of the balance beam 5.

Through relay P switch R is closed either on contact 306 or contact 307 according to the direction of the current through resistance 308. When contact 306 is closed the D.C. motor runs in one direction and when contact 307 is closed the motor runs in the opposite direction through control of the relay switches 309 and 310 respectively. Thus, the motor drives the screw rod 9 in the proper direction to move the counterweight to the rebalance position.

To insure against overshooting of the counterweight B beyond the precise balance point for each weighing, a means is provided whereby in each rebalancing operation the last several revolutions of screw rod 9 are accomplished in interrupted rotation, that is, start-and-stop rotations, such that the final, precise adjustment of the counterweight position is accomplished by a partial revolution of the screw rod 9 thus moving the counterweight a distance equal to a small fraction of one pitch of the thread on the screw rod. In this manner, superior accuracy is accomplished in positioning of the counterweight. The interrupted rotation of the screw rod 9 is controlled by the resistor-condenser-relay delay circuit Y (FIGURE 20) which comprises the automatic, low-voltage circuit breaker for controlling the current to motor 28 through relays 158 and 164. This delay circuit activates when the coil 21 of the unbalance sensing device D closely approaches the center position with respect to coil 14 which condition prevails when the balance beam 5 has very nearly reached its state of equilibrium during the weighing operation. In this position, the induced current flow through coil 21 is approaching zero (see FIGURE 23) and since relays 158 and 157 are energized by current in the secondary of transformer T, FIGURE 20, proportional to the disequilibrium of the beam, relay 158 will deenergize when the current is sufficiently small, closing contacts 148 to energize relay 160 through relay 164. Through discharge of the condenser in the circuit, relay 160 immediately opens to break the circuit to the motor 28 through relay contact 149, relay 159 and contact 151. Since relay 164 remains energized, a make-and-break process of relay 160 continues automatically, regulated by the condenser in parallel with relay 160, until the beam zero position is reached.

Automatic Recording and Reading System

This automatic recording and reading system which has been provided in the subject invention in its preferred form for automatically integrating and visually displaying, registering and recording, at one or more remote stations the measured values of weights or forces applied to the load platform of the apparatus, and desired associated data, is described as follows:

The remote integrating and recording system is illustrated in FIGURES 16, 17, 18, 22 and 24 in whole and in parts. The circular drums 70, 71, 72, 73 and 74 comprise the dials of an integrating counter for registering tens-of-thousands, thousands, hundreds, tens, and units from 0 to 99,999 total. The drums are formed with two circumferences, one of smaller diameter and one of slightly larger diameter. Printed on the smaller circumference of each drum and embossed on the larger circumference of each drum are numbers 0 to 9 equally spaced on the drum. The printed numbers are provided for visual reading of the amount of the measured weight through window 75 in the casing 76. The embossed numbers are provided for printing the amount of the measured weight on a carbon coated paper record card or the like, which can be inserted through slot 77 in place between the printing hammers 78 and the raised numbers on the dials 70, 71, 72, 73 and 74.

Electrical impulses are transmitted to the remote readout device by the following means which are divided into two devices, one for registering hundreds, thousands, and tens-of-thousands and the other for registering units and tens (one revolution of the screw rod 9 corresponding to 100 units):

For registering the hundreds, thousands, and tens-of-thousands, the disk 79 (FIGURES 15, 6 and 4) is provided having a radial notch 80 and an arc notch 81. On one side of the disk 79 a lamp 82 is located so as to project light rays through the notches 80 and 81 each time the disk makes one revolution. The disk 79 is fastened firmly to screw rod 9 at one end near the drive gear train. Opposite the lamps 82 on the other side of the disk 79 is a photodetector unit $b$ consisting of three phototransistors 83, 84, and 85. On the end of axle 49, FIGURE 6, is provided a radial switch 86 which makes contact with switch pole 87 or 88 (see FIGURE 19) according to the direction of rotation of the screw rod 9. Through the read-out control unit 0 (FIGURE 20), comprised of an appropriate circuit of relays, resistors, capacitors, diodes and transformers as illustrated when rotary switch 86 contacts pole 87 or pole 88, pulses are initiated by the phototransistor 83 or 85 when the slot 80 passes between them and the lamp 82. Each revolution of the disk 79 initiates one pulse to the remote read-out unit $d$ and each pulse registers 1/10 of a revolution of drum 72 (100 units of measure). The direction of rotation of the drum 72 is controlled by switch 86 according to the direction of rotation of screw rod 9.

Referring to FIGURES 19 and 20, when the axle 49 turns in one sense switch pole 88 is closed, relay 179 receives negative polarity and excites through resistor 242. Contact 137 shuts and relay 179 remains excited regardless of further action of switch 86. When on the contrary, switch pole 87 is closed, relay 179 coil is short-circuited and opens. Relay 179 thus takes a position which depends exactly on the revolving sense of screw 9.

The phototransistors are less resistive when they receive light flow and their collector potential is made nearer to ground potential.

Phototransistors 83 and 85 are connected to the bases of two junction transistors 171 and 172.

When phototransistor 83 receives light, transistor 171 of base potential goes more positive and it blocks. Its collector potential goes more negative and transistor 172 base goes more negative producing saturation. The operation is inverse when phototransistor 85 receives light. When disk 79 revolves, there are produced in the secondary coil of transformer 174 impulses of reverse polarity, which are transmitted to amplifying transistors 175, 176 and 177. The last named transistor controls the current through relay 178 which is normally operated and whose contacts 137 and 129 close and open upon every impulse.

It is to be noted that owing to the negative initial polarization of transistor 175, only positive impulses are able to actuate it.

The base of transistor 175 receives secondary coil current of transformer 174, in phase with primary current or 180° out of phase, depending on the actual state of relay 179, thus depending on the revolving sense of screw 9, through contacts 132, 133, 134, 135 to electromagnets 99 or 100. Thus relay 178 supplies an impulse when the light reaches first phototransistor 84 or phototransistor 83 according to the actual revolving sense or direction of screw 9.

Phototransistor 84, responding to light rays coming through the elongated arc slot 81, functions to maintain the direction of the motor 10 during the time interval between the pulses from photocell 83 and photocell 85.

In one direction each pulse will add an increment representation of one hundred units to the counter and in the other direction each pulse will rotate the drums in reverse direction and thus subtract one hundred units. The rotation of the drum shaft 102 is actuated by the reversible servo motor 110 through drive mechanism S (FIGURES 16 and 18). Each pulse initiated from the photodetector unit $b$ is transmitted to electromagnet 99 or electromagnet 100 (FIGURES 22 and 16) in an order depending upon the direction of revolution of screw 9. The common core-shaft of magnet coils 99 and 100 operates on finger 104 of the restraining mechanism 105 to permit one-hundred-unit drum 72 to revolve 1/10 of a revolution in the direction corresponding to the direction of rotation of screw rod 9 for each pulse. When drum 72 has rotated ten complete revolutions, drum 71 has rotated one revolution and drum 70 has rotated 1/10 revolution the latter two drums being driven at the proper ratios by sprockets 106. At any instant, the reading on the dials of drums 70, 71 and 72 indicate the quantity of whole revolutions completed by screw rod 9 from its zero position.

For registering the tens and units of measure, the supplementary pulse transmitting device $h$ is provided in the invention. (See FIGURES 11, 12, 13, 4 and 5.)

An insulated board 113 is fastened to a movable arm 114 which moves inward toward rotating arm 115 (FIGURES 11, 12 and 13) when the electromagnet 116 is energized. The electromagnet 116 is not energized until counterweight B is fully stopped in the rebalance-position for each weighing. The electromagnet 116 is firmly fastened on the bracket 117 mounted on frame 8. Contact brushes 118, 119, 120, 120a, 121 and 122a are carried on the rotating arm 115. On the insulated terminal board 113 are one hundred electrical terminal contacts 122 equally spaced in a circular arrangement. Each group of ten contacts 122 are electrically connected to form ten groups of ten contacts as shown in FIGURE 19. Also mounted on the insulated terminal board 113 are ten contacts 123 and two commutator rings 124 and 125. The brush contacts on the rotating arm 115 are positioned to engage the contacts 122 and 123 and the commutator rings 124 and 125 on the terminal board 113 when the electromagnet 116 is energized after the balance beam 5 has been rebalanced and come to rest.

In the remote read-out unit $d$ (FIGURES 16, 17 and 18) are located the terminal boards 126 and 127 (FIGURE 19) with associated rotating brushes 128 and 129. The insulated terminal boards 126 and 127 are fixed by suitable brackets onto the frame 76a of the unit. The brush contact 128 rotates with shaft 130 driven from motor 111. Shaft 130 also drives drum 74. The brush 128 sweeps across ten terminal contacts 131 on terminal board 126 as the shaft 130 rotates. Drum 73 is connected to the same shaft which drives brush 129 across ten terminal contacts 132 located on terminal board 126. Brushes 133 and 134 connect the terminal contacts 131 and 132 respectively to coil $c$ and coil $d$ of relay 135.

The contacts 122 on terminal board 113 are connected to the terminal boards 126 and 127 through relay 81 in a manner such that when brushes 128 and 129 touch the proper connected contacts 131 and 132, relay 136 (FIGURES 18 and 24) is energized and detent 137 engages one of the ten teeth on ratchet wheel 138 mounted on axle 139 and stops drums 73 and 74. Contact 140 opens and stops motor 111. The drums 73 and 74 are stopped in position such that the correct numerals appear for reading out tens of units and units.

The indicia on drums 73 and 74 are correlated with the angle of rotation of the screw-rod 9 with respect to the zero position as located by slot 141 on disk 79; drum 73 revolving one revolution for each ten revolutions of drum 74. Since one revolution of screw 9 corresponds to 100 units of measure, the drums 73 and 74 indicate tens of units and units or, in other words, percent of 100 units. Complete circuitry for the novel counting and indicating system is shown in FIGURE 19.

Phototransistor 84 (FIGURE 15) functions in two ways: When slot 80 is between the two phototransistors 83 and 84, transistor 84 holds the proper contacts open to prevent motor 28 from reversing; when the rebalance-position of the balance beam counterweight B is such that slot 80 rests between phototransistors 83 and 85, transistor 84 controls the proper circuit relays to stop brushes 128 and 129 on the proper terminal contacts corresponding to the count of 99 or 00 on the drums 73 and 74. Phototransistor 84 controls relay 209, FIGURE 20, which operates when 84 receives light.

Contact 214 opens. Relay 302, FIGURE 19, opens after a time delay of 3 seconds, due to condenser 300 and resistor 301A. Relays 180 and 181 operate through contact 303A.

Contacts 107, 108, 109, 110, 111 and 112 disconnect the contacts of board 113 which correspond to the following indications: 98 kg., 99 kg., 0 kg., 1 kg. Polarized relay 173 has its contact 139 or its contact 140 closed according to the actual state of transistors 171 and 172, thus according to the figure to be transmitted at the moment, 99 or 00. These contacts secure all the necessary connections to control stopping of brushes 128 and 129 upon the contacts corresponding to 99 or 00. When contact 213 closes it confirms excitation of that one of the two relays 197 or 198 which was energized. While this contact remains shut the sense of revolving of motor 28 cannot be inverted.

Since the positions of drums 73 and 74 will thus be established strictly in accordance with the weight registered by the scale mechanism, the same data can register in printed form by a set of type wheels connected directly to the register wheels. At the same time, provision may be made for printing the date, cumulative totals or sub-totals, or any desired associated information. These printing operations may be performed automatically or periodically as desired by the user, either at the completion of each registering operation, each day or other accounting period, or any of these. Duplicate registrations are readily provided, either by duplicate printing or by a separate printing operation at a second remote or supervisory location. The use of electrical pulses for conveying the basic information, i.e., the weight in terms of the sense of direction of counterpoise motion along with its numerical value, permits the greatest flexibility in the data output facilities.

Printing action is free of error due to impossible premature printing. This results from the fact that a phototransistor on one side prevents the motor from reversing its sense of rotation by virtue of a notch being between the two phototransistors to thereby prevent transmitting errors in the impulses.

Automatic Taring Device

The automatic taring device of this invention has been devised to compensate automatically for accidental changes of the zero setting of the scales where no load or tare load is applied. The basic elements of the taring device are shown in FIGURES 5, 14 and 15. The motor 150 and auxiliary counterweight 151 and associated drive train are mounted on balance lever 5 in a balanced position. The counterweight B carries a finger 142 which contacts switch lever 143 actuating micro switch 144 which operates in conjunction with disk 79 and electromagnet 145 (FIGURE 15) operating switches 146 and 147 (FIGURE 19).

The disk 79 has two half-circumferences of unequal diameters, 79a being the smaller and 79b the larger, and a radial notch 141 on its periphery. The electromagnet 145 has a finger 148 which engages notch 141 when the reader-printer drums show zero. However, if the scale is out of adjustment or an accidental tare load is applied to the platform causing erroneous reading, the automatic taring device will correct the system to within one-half revolution of screw rod 9 or equivalent measure of 0.5/100 weight unit, as follows:

The taring device is controlled by the operator depressing push button switches 144 and 145 on the control panel and thus energizing electromagnet 145. Electromagnet 145 actuates switches 146 and 147. The position of disk 79 (which is fastened at one end of screw rod 9) determines the polarity of the switches 146 and 147 (FIGURE 15). When the zero out of balance is positive, the finger 148 touches the larger circumference 79b of disk 79, and both switches 146 and 147 are open. When the zero out of balance is negative, the finger 148 touches the smaller circumference 79a of disk 79 and switch 146 closes. As the disk 79 rotates the position where the notch 141 is in line with finger 148, the finger drops into the notch and switch 147 is closed. The finger 148 permits the disk 79 (and thus the rod 9) to turn in the correct direction for ½ turn when the push button taring switch is depressed. Through the related relay control circuit of FIGURES 19 and 20, the electric motor 150 (FIGURE 14) is energized to rotate in the proper direction for moving auxiliary counter poise 151 in the proper direction along shaft 152 to compensate for the tare load or off-zero error and rebalance the beam 5 to the zero position. The total adjustment of the auxiliary counterpoise can compensate $\frac{1}{1000}$ of the total range of the scale.

To provide an alternative optional read-out or visual display of the measure of weight which may be desired for some application of the scales, an integral device is provided as illustrated in FIGURE 21. The two film reels 600 and 601 are mounted on a fixture 602 on the balance beam 5. A light projector 603 is likewise mounted on fixture 602. The film 607 is wound on the two reels; one end over reel 600 and the other over reel 601. The reels are driven by belts 608 on belt pulleys 607 which are driven by gear train 606—605 from screw shaft 9 according to the direction of rotation of the screw shaft 9. The gear train ratio is such that the displacement of ten meters of film is obtained for the complete run of the counterweight B corresponding to one thousand revolutions of screw 9. The film 604 is engraved with 5 unit graduations and numerals from zero to 100,000. As the screw shaft 9 revolves to rebalance the scales, the film is wound upward or downward a distance corresponding to the direction of balance corrections. When the balance beam 5 has come to rest, the film stops in a position such that the indicia corresponding to the measured weight are centered in from the projection lens 609, and when the operator presses the projection light switch, on the control panel, the correct indication of the measured weight is projected on the screen 610 in enlarged size for accurate reading.

It is recognized that those working in the weighing and force-measuring fields have proposed numerous designs for more or less fully automatic devices of this kind, and of recent years particular efforts have been made to produce such designs which are entirely electronic in nature. For example, scales which dispense with balancing arrangements and relay for operation upon direct sensing of strain forces in load cells or similar transducers. While the use of such expedients often gives an apparent gain in response time, it is always accomplished with sacrifices in accuracy, or with the introduction of complications in the way of temperature and time recalibration, and so on. The present invention aims at retaining the time-tested principle of weight comparison against the moment arm of a balance device, and overcomes the speed and like limitations by a proper combination of electro-mechanical elements and circuitry, rather than yielding a practical commercial solution without unnecessary complexity or requirement for frequent maintenance and expertly trained personnel.

It is emphasized that a prime characteristic of the invention is its ability to give a weight or force indication without the necessity for re-setting the balance mechanism to a zero condition before each use. By suitable designs, as represented by the embodiments disclosed above, a considerable saving in cycle time is directly accomplished in this way, especially in those operations which involve the sequential measurement of weights or forces which are approximately of the same order magnitude. A minimum of the cycle time is required because the counterpoise is shifted directly in the proper direction with respect to its last position of rest, rather than having to be returned to zero and then restored to the new balance point.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A method of moving a motor-driven movable poise on a weighing instrument to a balance position, which method comprises the steps of:
   (a) operating the motor drive at a first speed to move said poise to a point which is a first predetermined amount short of the balance position.
   (b) then operating said motor drive at a second speed, slower than said first speed, to move said poise to a point which is a smaller predetermined amount short of the balance position, and
   (c) thereafter operating said motor drive intermittently in the same direction at said second speed to move said poise to the precise balance position.

2. The method of re-balancing a weighing instrument counterpoise by an electrical motor drive, comprising electrically sensing the magnitude of the displacement of said counterpoise from a balance position by developing an electrical signal having a magnitude proportional to the degree of unbalance, energizing the motor drive to rapidly move the counterpoise in a direction toward the balancing position for a period sufficient to bring the magnitude of said signal below a predetermined value, and thereafter intermittently energizing the motor drive to move the counterpoise intermittently in small successive equal increments in that direction until the magnitude of said signal has been reduced to a value not greater than that corresponding to one such increment.

3. A method of moving a motor driven bi-directionally movable poise on a weighing instrument to a balance position in response to an electrical signal having a magnitude proportional to the degree of unbalance of said instrument, which method comprises the steps of:
   (a) operating the motor drive in one direction at a first speed to move said poise toward balance position until the magnitude of said signal decreases to at least substantially a first predetermined value,
   (b) then operating said motor drive at a second speed, slower than said first speed, until the magnitude of said signal decreases to at least substantially a second and smaller predetermined value, and
   (c) thereafter operating said motor drive intermittently in the same direction at said second speed until the magnitude of said signal decreases substantially to a zero value.

4. In an automatic rebalancing weighing scale of the beam type having a movable poise for balancing the scale beam, means for continuously electrically sensing the direction and extent to which the scale beam is away from its balanced position, a reversible drive for said poise, and means controlled by said sensing means for energizing said drive to move said poise toward the balanced position at one of a given plurality of effective speeds depending upon the extent to which the poise position departs from the balanced position.

5. A weighing scale in accordance with claim 4, in which said sensing means is differently responsive to at least three different degrees of unbalance displacement of said poise, and in which the means controlled by said sensing means is capable of energizing said drive in at least three corresponding differing modes, in a single direction, representing three successively slower rates of motion of said poise.

6. A weighing scale in accordance with claim 5, in which one of said modes of energization of said drive is an intermittent stepwise mode.

7. A scale comprising a beam, a poise carried by and movable along said beam, an electric motor supported on said beam for moving the poise, electric circuits for operating said motor in two directions, means for lowering the speed of the poise movement as the beam approaches balance, and means for rapidly and intermittently breaking and making one of the motor circuits to intermittently drive the poise when the beam more closely approaches balance.

8. A scale as described in claim 7 wherein said means for making and breaking the motor circuits comprises an electromagnetic switch coupled with a source of power and having a control means including a condenser coupled in parallel to said switch for intermittent operation of said switch in response to the charge and discharge of the condenser.

9. In a weighing apparatus including a balanceable element and a member movable thereon to balance said element, the improvement comprising the combination of a variable speed bi-directional drive means for moving said member along said element, direction sensing means for directionally activating said drive means to move said member toward a balance position, control signal generating means for producing an electrical signal having a magnitude continuously proportional to the degree of unbalance of said element, and circuit means responsive to the magnitude of said electrical signal for operating said drive means first continuously and thereafter intermittently as said member approaches balance position in one direction.

10. The improvement comprising the combination of claim 9 wherein said drive means comprises a single motor, reversing gear means, and electromagnetic means coupled to said circuit means and arranged to position said motor for selectively connecting said motor with said gear means to reverse the drive direction.

11. The improvement comprising the combination defined in claim 10 further including switching means activated by movement of said element as it approaches balance position, and means coupling said switching means with said electromagnetic means for operation thereof.

12. The improvement comprising the combination of claim 9 wherein said control signal generating means includes means for generating a variable magnetic field in response to a given A.C. electrical signal at a fixed location, and coil means movable within said field in response to movement of said element for generating an induced A.C. electrical signal having a magnitude representative of the degree of unbalance, and a phase with respect to said given signal representative of the direction of unbalance.

13. The improvement comprising the combination defined in claim 12 wherein said direction sensing means includes means coupled in said circuit means for comparing the phase of said induced A.C. electrical signal with the phase of said given electrical signal to produce a directional output signal.

14. The improvement comprising the combination of claim 9 further including switching means activated by movement of said element, and coupled to said drive means for selecting the operating speed of said drive means.

15. A force measuring apparatus comprising a balance beam, a poise carried by and movable along said beam, an electric motor for moving said poise to restore the beam to balance after application of a force thereto, an electromagnetic starting device having relatively movable field and armature members, the movable member being responsive to movement of the beam, said members including an exciting winding and an induction winding, means for exciting one of said windings with alternating current whereby movement of the movable member induces a signal in the other winding out of phase with the current of said one winding, and means for sensing said signal and starting said motor in the appropriate direction to re-balance the beam, said means for sensing and starting comprising an amplifier, a transformer having a primary winding connected across the amplifier output, a pair of rectifiers in series with a first resistor and coupled across the secondary winding of said transformer, said transformer secondary winding having a tap thereon connected to one side of said one winding, said resistor having a tap thereon connected to the other side of said one winding, a second resistor connected between said two taps, and a differential relay connected across said first resistor and having switch contacts adapted to energize said motor in a direction corresponding to the direction of the rectified current in said first resistor.

16. A weighing apparatus comprising a beam, a poise carried by and movable along said beam, an electric motor and associated circuits for moving said poise, and mechanical damping means for said beam including a pair of additional levers, each having a counterweight and each coacting with said beam only when said beam is unbalanced, to oppose tilting movements of said beam in respective directions.

17. A weighing apparatus comprising a beam, a poise carried by and movable along said beam, an electric motor pivotally supported on said beam, mechanical speed reduction means supported on said beam and comprising high and low speed sets of gears, one set mounted at each end of said motor whereby pivoting of said motor causes operation thereby of one or the other of said sets of gears, an electromagnet on said beam for holding said motor pivoted to operate the slow speed set of gears when said beam is near balance, spring means for pivoting said motor to operate the high speed set of gears upon release of said electromagnet, electric circuits for operating said motor in two directions, and means including electronic circuits actuated by the tilting of said beam to operate said motor.

18. A weighing apparatus comprising a beam, a poise carried by and movable along said beam, electric drive means for moving said poise, an auxiliary counter-weight mounted on said beam, auxiliary electrically responsive drive means for moving said auxiliary counter-weight to compensate for tare weight, primary circuit means for controlling said electric drive means to balance said beam and including balance sensing means, and secondary circuit means coupled to said auxiliary drive means and said sensing means for automatically causing movement of said auxiliary counter-weight to a balance position.

19. A weighing apparatus as defined in claim 18 and further including switching means activated by said poise when in zero position for rendering said secondary circuit means operative.

20. A weighing apparatus as defined in claim 18 wherein said secondary circuit means includes direction sensing means for determining the required direction of movement of said auxiliary counter-weight for balance.

21. In a direct-reading digital-indicating weighing scale of the type, including a balance mechanism having a steelyard arm, a counterpoise shiftable along said arm to balance at least the residual moment of said mechanism, electrical means for sensing an unbalanced condition of said arm, bi-directional rotary power means responsive to said sensing means for shifting said counterpoise to a position of balance, and digital indicating means for registering the weight balanced by said counterpoise; the improvement comprising means for developing electrical signals corresponding in number and direction to unit movement of said counterpoise, and means responsive to said signals for operating said indicating means.

22. A direct-reading digital-indicating weighing scale, comprising a weighing balance mechanism including a steelyard arm, a counterpoise shiftable along said arm to balance the mechanism, a differential transformer connected to said arm for sensing an unbalanced condition and generating signals indicative thereof, drive means including a lead screw for moving said counterpoise bi-directionally lengthwise of said arm, servo-control means energized by said transformer and connected to said drive means to energize the latter in the direction to counteract any unbalance sensed by said transformer, pulse generating means for producing impulses in response to rotation of said screw, and indicating means responsive jointly to said impulses produced in said pulse generating means and to said signals produced in said transformer to indicate the shifted position of said counterpoise.

23. A direct-reading digital-indicating weighing scale in accordance with claim 22 wherein said indicating means is remotely positioned with respect to said weighing balance mechanism.

24. A system for the remote indication of the precise position of a screw operated device such as the poise of a weighing scale, comprising pulse generating means coupled to said screw for generating respective up-count and down-count pulses corresponding to integral rotations of the screw, angular-position transmitting means coupled to said screw for transmitting an indication of the fractional part of a rotation thereof from a fiducial position thereof, and a position indicator having sections respectively connected to said generating means and to said transmitting means.

25. A system in accordance with claim 24, in which said transmitting means comprises a rotary switch device.

26. A system in accordance with claim 24, including means for disabling said transmitting means during periods of rotation of said screw.

27. A weighing apparatus comprising a beam, a poise carried by and movable along said beam, electric means for driving said poise in two directions, a remote register for indicating the total movement of said poise required to balance the beam, control means responsive to electrical control signals for operating said register, and photo-electric operated means responsive to incremental movement of the beam in either direction to produce said control signals and feed said control signals to said control means, said photo-electric operated means comprising a disk turnable in proportion to movement of said poise, said disk having a slot therein, a light source on one side of the disk, and a pair of photo-elements on the other side of said disk whereby each turning passage of said slot releases a light beam to one of said photo-elements and causes production of a control signal thereby, second slot substantially at right angle to said first slot being formed in said disk, said photo-electric operated means further including a photo-element positioned to receive light through said second slot during periods when said first slot is between said pair of photo-elements whereby a maintaining control signal is then produced, said control means being coupled to said last mentioned photo-element and responsive to the signal produced thereby.

28. A weighing apparatus according to claim 27 wherein said remote register includes at least two electromagnet means for operating said register in opposite directions respectively, and said photo-electric operated means further comprises an electronic circuit including impulse detection means, an amplifier, and a relay having alternate sets of contacts for impulsing one or another of said electromagnet means in said register depending upon the direction of movement of said poise.

29. In an indicating weighing apparatus of the type including a balanceable beam, a counterpoise movable along said beam, bi-directionally operative drive means including a rotating shaft for driving said counterpoise to balance position, and mechanically operative indicating means; the improvement comprising the combination of bi-directionally operative electromechanical means for actuating said indicating means, sensing means for developing an electrical pulse for each revolution of said shaft, and means for applying said pulses to said electromechanical means to thereby activate said indicating means, said electromechanical means comprising a pair of solenoid means disposed to move an actuating member of said indicating means in respectively opposite directions whereby said indicating means adds or subtracts, said sensing means including a pair of arcuately spaced radiant energy receivers coupled in circuit respectively to each of said solenoid means for respective operation thereof, an additional radiant energy receiver, said disc having a radial slot and an arcuate slot, said arcuate slot being disposed to pass radiant energy to said additional receiver when said radial slot is located between positions where energy is passed to one or the other of said pair of receivers, and circuit means activated by said additional receiver for maintaining previous directional operation of said drive means.

30. In an indicating weighing apparatus of the type including a balanceable beam, a counterpoise movable along said beam, bi-directionally operative drive means including a rotating shaft for driving said counterpoise to balance position, and mechanically operative indicating means having at least two separately movable indicating members; the improvement comprising the combination of first electrically responsive activating means for moving one of said members, control sensing means for producing a signal in response to revolution of said shaft and applying said signal to said first activating means, second electrically responsive activating means for moving said other member, a pair of commutator means coupled respectively with said shaft and said other member, and circuit means coupled between said commutator means for deactivating said second activating means when said commutator means are in predetermined relative positions.

31. The improvement comprising the combination defined in claim 30 wherein said control sensing means includes photo-electric sensing elements.

32. The improvement comprising the combination defined in claim 30 and further including means for operating said commutator means only when said counterpoise is at at least substantially said balance position.

References Cited in the file of this patent
UNITED STATES PATENTS

| | | |
|---|---|---|
| 673,684 | Lane | May 7, 1901 |
| 1,290,278 | Methven | Jan. 7, 1919 |
| 1,294,408 | Crane | Feb. 18, 1919 |
| 1,344,339 | Foote | June 22, 1920 |
| 1,449,162 | Boyer | Mar. 20, 1923 |
| 1,872,851 | Van Weenen | Aug. 23, 1932 |
| 1,885,356 | Karrer | Nov. 1, 1932 |
| 2,007,317 | Bohuszewicz | July 9, 1935 |
| 2,068,565 | Okey | Jan. 19, 1937 |
| 2,420,590 | Everhart | May 13, 1947 |
| 2,481,347 | Riggin | Sept. 6, 1949 |
| 2,541,915 | Culver | Feb. 13, 1951 |
| 2,685,082 | Beman et al. | July 27, 1954 |
| 2,765,160 | Dietert | Oct. 2, 1956 |
| 2,768,823 | Lindars | Oct. 30, 1956 |
| 2,854,714 | Dietert | Oct. 7, 1958 |
| 3,042,128 | Bell | July 3, 1962 |
| 3,044,691 | Allen | July 17, 1962 |

OTHER REFERENCES

British Tabulating Machine Co., Catalogue, 17 Park Lane, London, England. Received Jan. 1, 1959, 11 pages, note pages 6–7.